United States Patent
Dao

(10) Patent No.: US 11,783,328 B2
(45) Date of Patent: Oct. 10, 2023

(54) SYSTEMS AND METHODS FOR WALLET, TOKEN, AND TRANSACTION MANAGEMENT USING DISTRIBUTED LEDGERS

(71) Applicant: JPMORGAN CHASE BANK, N.A., New York, NY (US)

(72) Inventor: Tuan Dao, Richardson, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 520 days.

(21) Appl. No.: 16/703,648

(22) Filed: Dec. 4, 2019

(65) Prior Publication Data
US 2020/0193431 A1 Jun. 18, 2020

Related U.S. Application Data

(60) Provisional application No. 62/779,958, filed on Dec. 14, 2018.

(51) Int. Cl.
| | |
|---|---|
| G06Q 20/38 | (2012.01) |
| G06Q 20/36 | (2012.01) |
| G06Q 20/40 | (2012.01) |
| H04L 9/00 | (2022.01) |

(52) U.S. Cl.
CPC ..... G06Q 20/3829 (2013.01); G06Q 20/3674 (2013.01); G06Q 20/401 (2013.01); G06Q 2220/00 (2013.01); H04L 9/50 (2022.05); H04L 2209/56 (2013.01)

(58) Field of Classification Search
CPC ............. G06Q 20/3829; G06Q 20/374; G06Q 20/401; G06Q 2220/00; H04L 9/3247

USPC .......................................................... 705/71
See application file for complete search history.

(56) References Cited

U.S. PATENT DOCUMENTS

| | | | |
|---|---|---|---|
| 11,049,128 B1* | 6/2021 | Olson | G06Q 20/02 |
| 2017/0005804 A1 | 1/2017 | Zinder | |
| 2017/0017958 A1* | 1/2017 | Scott | G06Q 20/40 |
| 2018/0068130 A1 | 3/2018 | Chan et al. | |
| 2018/0101906 A1* | 4/2018 | McDonald | G06Q 20/204 |
| 2019/0012695 A1* | 1/2019 | Bishnoi | G06Q 30/0238 |
| 2019/0108543 A1* | 4/2019 | Chan | G06Q 30/0229 |
| 2019/0188793 A1* | 6/2019 | Molinari | G06Q 40/06 |

(Continued)

OTHER PUBLICATIONS

International Search Report, dated Feb. 2, 2020, from corresponding International Application No. PCT/US2019/065708.

(Continued)

*Primary Examiner* — Courtney P Jones
(74) *Attorney, Agent, or Firm* — GREENBERG TRAURIG LLP

(57) ABSTRACT

Systems and methods for wallet, token, and transaction management using distributed ledgers are disclosed. According to one embodiment, in node of a distributed ledger network comprising an information processing apparatus having at least one computer processor, a method for card or token parameter management using a distributed ledger may include: (1) receiving, from an electronic wallet, a token state change for a payment token associated with electronic wallet, wherein the token state change is encrypted with a public key associated with the electronic wallet; (2) validating the encrypted token state change; and (3) committing the encrypted token state change to a distributed ledger.

16 Claims, 8 Drawing Sheets

(56) References Cited

U.S. PATENT DOCUMENTS

2019/0311392 A1* 10/2019 Swamidurai ........ H04L 63/0442
2019/0318103 A1* 10/2019 Anton ................. G06F 12/1018
2021/0097530 A1*  4/2021 Chang .................. H04L 9/3239
2021/0209584 A1*  7/2021 Donald .............. G06Q 30/0276

OTHER PUBLICATIONS

Written Opinion of the International Searching Authority, dated Feb. 2, 2020, from corresponding International Application No. PCT/US2019/065708.
International Search Report and Written Opinion of the International Searching Authority, dated Feb. 5, 2020, from corresponding International Application No. PCT/US2019/065708.
Anonymous; "Cryptocurrency Wallet—Wikipedia", Nov. 29, 2018.

\* cited by examiner

SYSTEMS AND METHODS FOR WALLET, TOKEN, AND TRANSACTION MANAGEMENT USING DISTRIBUTED LEDGERS

RELATED APPLICATIONS

This application claims the benefit of U.S. Provisional Patent Application Ser. No. 62/779,958, filed Dec. 14, 2018, the disclosure of which is hereby incorporated, by reference, in its entirety.

BACKGROUND OF THE INVENTION

1. Field of the Invention

Embodiments are directed to systems and methods for wallet, token, and transaction management using distributed ledgers.

2. Description of the Related Art

Operations involving digital wallets require coordinated management of wallet status changes, token status changes, and transaction status changes among multiple systems such as Token Service Provider(s), Wallet Provider(s), an Issuer Token Vault, and Issuer backend systems (e.g., an Authorization Platform). To achieve this, API calls with request parameters and responses are used; these API calls, however, do not provide historical records and audit trails of event sequences involving these systems.

SUMMARY OF THE INVENTION

Systems and methods for wallet, token, and transaction management using distributed ledgers are disclosed. According to one embodiment, in node of a distributed ledger network comprising an information processing apparatus having at least one computer processor, a method for card or token parameter management using a distributed ledger may include: (1) receiving, from an electronic wallet, a token state change for a payment token associated with electronic wallet, wherein the token state change is encrypted with a public key associated with the electronic wallet; (2) validating the encrypted token state change; and (3) committing the encrypted token state change to a distributed ledger.

In one embodiment, the token state change may be a change in a link state, a change in a bound state, a change in a suppression state, a change in lifecycle state, etc.

In one embodiment, the electronic wallet may be associated with the node.

In one embodiment, a notification service may notify a second wallet of the token state change.

According to another embodiment, in a notification service comprising at least one computer processor, a method for card or token parameter management using distributed ledgers may include: (1) monitoring a distributed ledger for token state changes for a plurality of payment tokens; (2) detecting a change to a token state for one of the plurality of payment tokens; and (3) notifying an electronic wallet associated with the payment token of the change to the token state.

In one embodiment, the token state change may include a change in a link state, a change in a bound state, a change in a suppression state, a change in lifecycle state, etc.

In one embodiment, the token state change originated with a second electronic wallet.

In one embodiment, the notification service is a third-party notification service.

In one embodiment, the notification may be a push notification.

In one embodiment, the electronic wallet may retrieve the token state from the distributed ledger following the receipt of the notification.

According to another embodiment, in node in a distributed ledger network comprising at least one computer processor, a method for transaction management with an alternative payment currency using distributed ledgers may include: (1) receiving, from an electronic wallet, a selection of a payment mode for a transaction; (2) validating an availability of the payment mode; (3) writing the payment mode and the validation to the distributed ledger, wherein the transaction is conducted using the payment mode; and (4) writing the conducted transaction with the payment mode to the distributed ledger.

In one embodiment, the payment mode may be to pay with an alternate currency. The alternate currency may be points.

In one embodiment, the step of validating an availability of the payment mode may include retrieving, from an issuer system associated with the payment mode, validation that at least a portion of the transaction can be conducted with the payment mode, and the portion of the transaction that can be conducted with the payment mode may be conducted with the payment mode.

In one embodiment, a second portion of the transaction may be conducted over a payment network, and the method may further include writing the second portion of the transaction to the distributed ledger.

In one embodiment, the payment mode and/or the validation may be encrypted before being written to the distributed ledger.

In one embodiment, the payment mode may be received via an API gateway.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are generally directed to systems and methods for wallet, token, and transaction management using distributed ledgers.

Embodiments may use a distributed ledger, such as a block chain, to record the triggering or initiating event which allows for each contributing system in the sequence of management the status changes to securely and uniquely record changes it may make.

For example, embodiments may be used to synchronize issuer and third party systems, such as that disclosed in U.S. patent application Ser. No. 16/220,924, the disclosure of which is hereby incorporated, by reference, in its entirety; manage issuer or wallet providers to issue instructions to individual wallets; manage transaction modification and adding transaction attributes outside of payment networks standards (e.g., to enhance tracking token wallet characteristics (TWC), token transaction characteristics (TTC), and payment instruction matching across ecosystems as well as their lifecycle (U.S. patent application Ser. No. 16/010,677, the disclosure of which is hereby incorporated, by reference, in its entirety).

Figure 1:
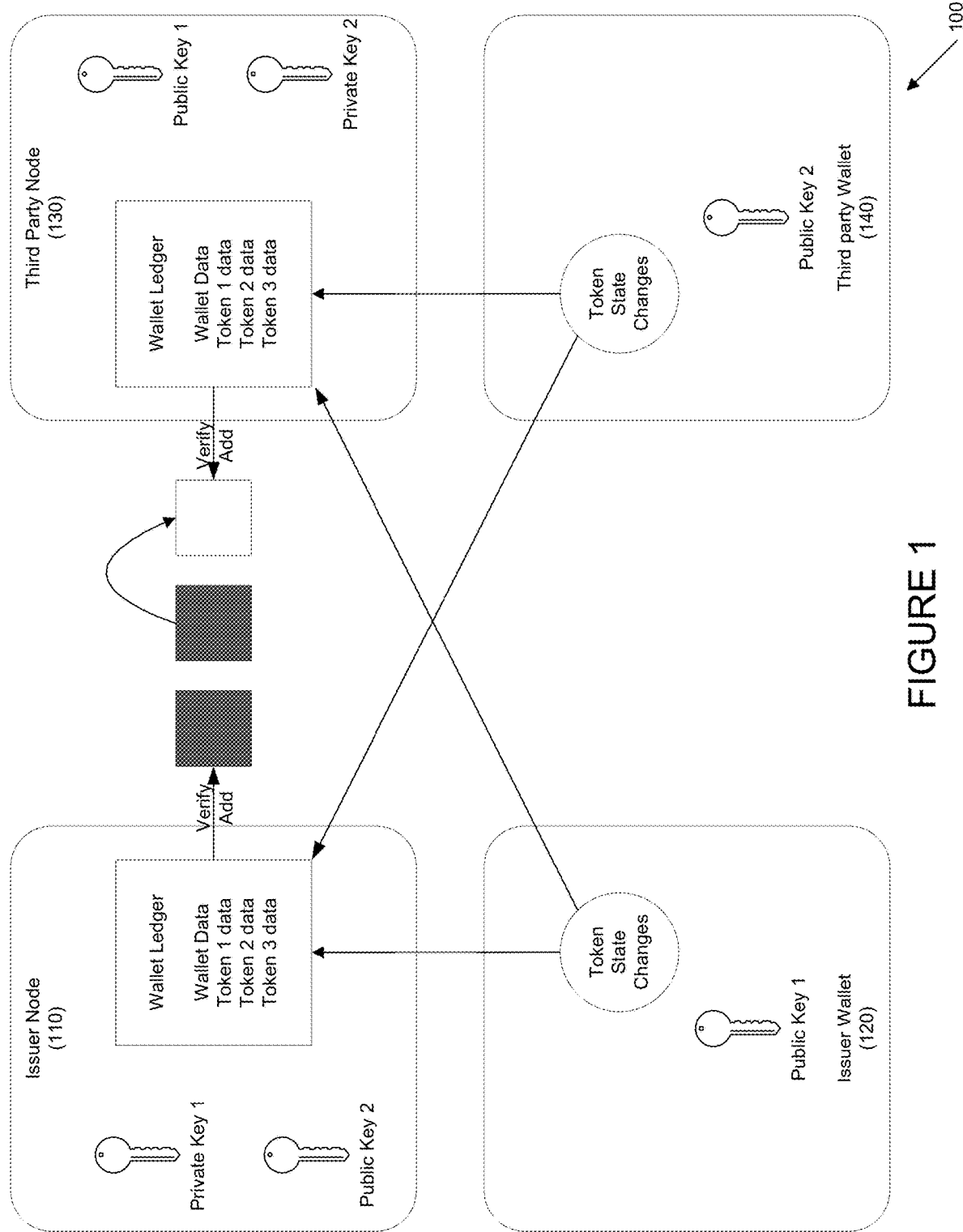
FIG. 1 depicts a system for card or token parameter management using distributed ledgers according to one embodiment.

Referring to FIG. 1, a system for wallet, token, and transaction management using distributed ledgers is disclosed according to one embodiment. System 100 may include issuer node 110, issuer wallet 120, third party node 130, and third-party wallet 140.

Although only two nodes and two wallets are depicted, it should be recognized that a greater number of wallets and nodes may be provided as is necessary and/or desired.

Issuer node 110 and third-party node 130 may each maintain or have access to public keys (e.g., public key 1 and public key 2) for issuer wallet 120 and third-party wallet 140, and each may each maintain a copy of a wallet ledger. The wallet ledgers may be a blockchain, or Ethereum-based, ledger. An example of such is J.P. Morgan's Quorum™ blockchain technology.

Any suitable distributed ledger may be used as is necessary and/or desired.

In one embodiment, wallet 120 and/or wallet 140 may participate as nodes.

Each wallet 120, 140 may have its own public key (e.g., public key 1 and public key 2, respectively), and may maintain token state changes (e.g., token is linked or unlinked, token is bound or unbound, etc.). In one embodiment, changes in suppression states (e.g., NFC suppression, pay-with-points suppression, etc.), changes in lifecycle state (e.g., activated, deactivated, suspended, etc.), changes in user preferences, etc. may further be maintained by each wallet 120, 140 with the token state changes.

Although embodiments are disclosed as using asymmetric encryption, it should be noted that wallets 120, 140 and nodes 120, 130 may use symmetric approach as is necessary and/or desired.

In one embodiment, when a state change occurs, it may be written by issuer node 110 or third-party node 130 to its respective copy of the wallet ledger.

In one embodiment, a change originating with issuer wallet 120 or third-party wallet 140 may be communicated to one of the nodes. For example, issuer wallet 120 may communicate the change to issuer node 110, third-party node 140, etc. The change may be validated, some or all of the data may be encrypted with the respective public key (e.g., public key 1 or public key 2, respectively), and written to the distributed ledger.

Figure 2:
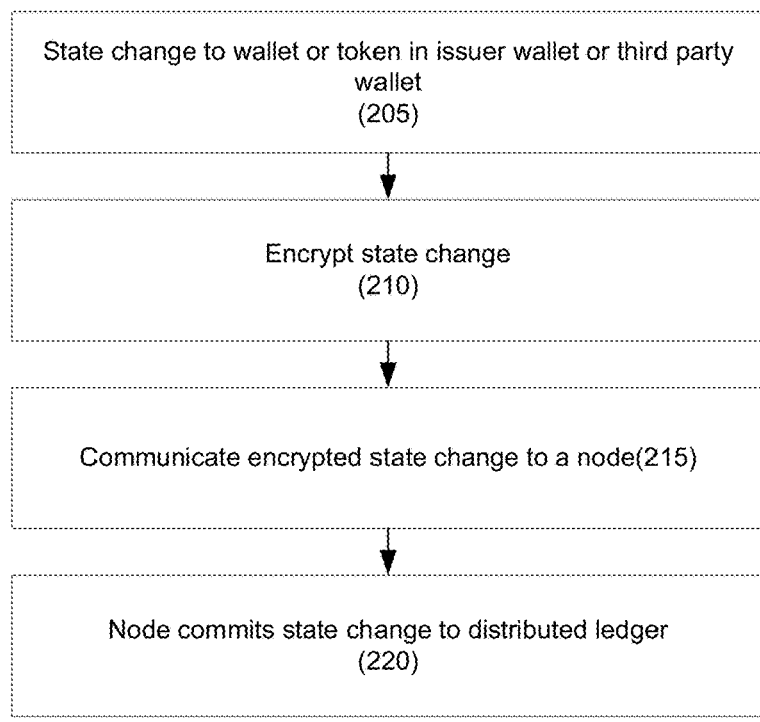
FIG. 2 depicts an exemplary method of card or token parameter management using distributed ledgers according to one embodiment.

Referring to FIG. 2, a method for wallet management is provided according to one embodiment.

In step 205, a token state change may occur in an issuer wallet or in a third-party wallet. For example, the token state change may be a link state, a bound state, a suppression state, a lifecycle state, etc.

In step 210, some or all of the state change may be encrypted with, for example, the wallet's public key.

In step 215, the state change may be communicated from the wallet to a node. In one embodiment, the state change may be communicated to any node; in another embodiment, the wallet may only communicate the state change to its respective node.

The node may validate the change, and in step 220, the node may commit the encrypted state change to the distributed ledger.

Figure 3:
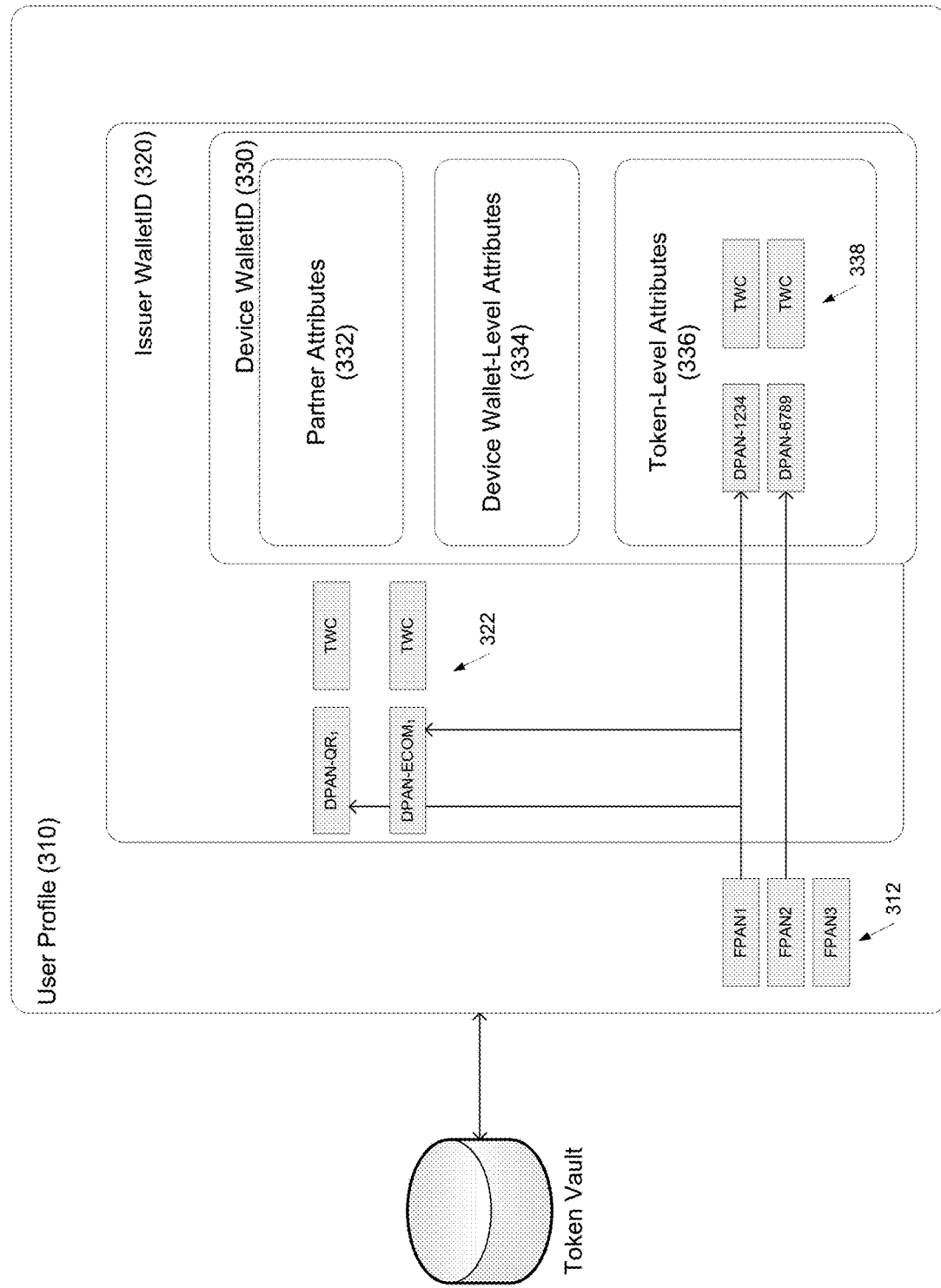
FIG. 3 depicts an exemplary data structure according to one embodiment.

Referring to FIG. 3, an exemplary data structure is provided according to one embodiment. For example, user profile 310 may include accounts 312, such as FPAN 1, FPAN2, FPAN 3, etc. Each user profile 310 may include Issuer WalletID 320, which may include tokens 322, each of which may have a digital PAN (DPAN), a token wallet characteristic (TWC), etc.). In one embodiment, the tokens may be cloud-based tokens. Each Issuer Wallet ID 320 may include a device-bound wallet container, such as a DeviceWalletID 330, which may be an identifier for a particular user's Issuer wallet application on the device. DeviceWalletID 330 may specify, for example, partner attributes 332 (e.g., a third-party wallet ID), device wallet-level attributes 334 (e.g., a DeviceWalletID, user preferences 336 (e.g., show preferences, default preferences, etc.) and token-level attributes for tokens 338 (e.g., Token Wallet Characteristic, or TWC, that may identify a linkage between the issuer wallet application and the third-party wallet application). It may further identify whether the profile is bound or unbound to a third-party wallet.

Figure 4:
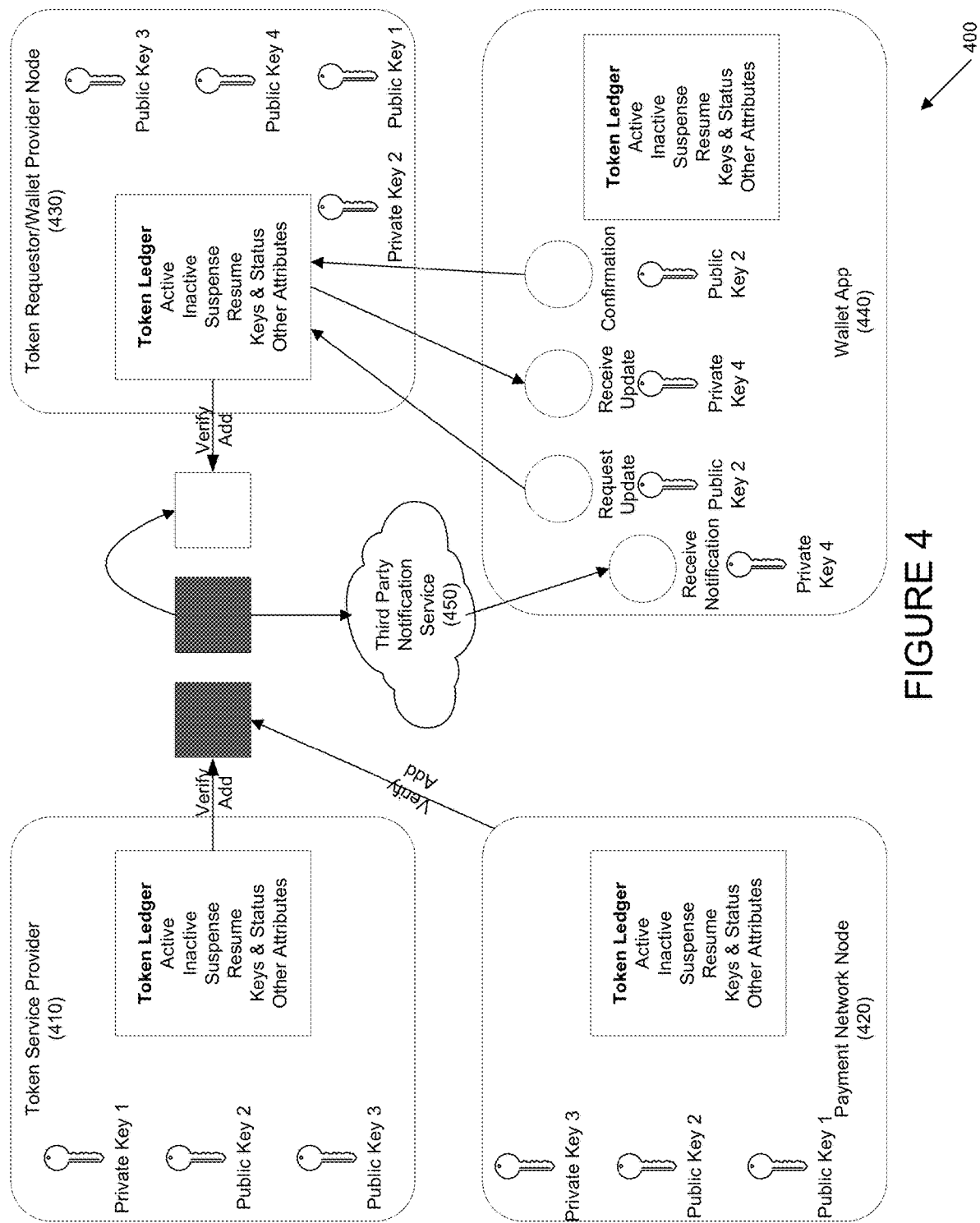
FIG. 4 depicts an exemplary system for card or token parameter management using distributed ledgers according to one embodiment.

Referring to FIG. 4, a system for card or token parameter management using distributed ledgers is disclosed according to one embodiment. System 400 may include issuer node 410, issuer wallet 420, optional payment networks node 430, wallet app 440, which may be an issuer wallet app, a third-party wallet app, etc., and third-party notification service 450.

For example, card or token parameters (e.g., active, deactivated, suspended, keys, other attributes, etc.) may be verified and written to the distributed token ledger.

In one embodiment, payment networks node 420 may participate as a node.

In one embodiment, wallet application 440 is participating as a node, wallet application 440 may maintain a copy of the token ledger. Wallet application 440 may further maintain private key 4 and may share public key 2.

In one embodiment, third-party notification service 450 may provide the ability for a cloud-based server to communicate with an electronic device using, for example, a push notification. Third-party notification service 450 may provide wallet app 440 with a notification that a change involving a token associated with wallet app 440 has occurred.

Figure 5:
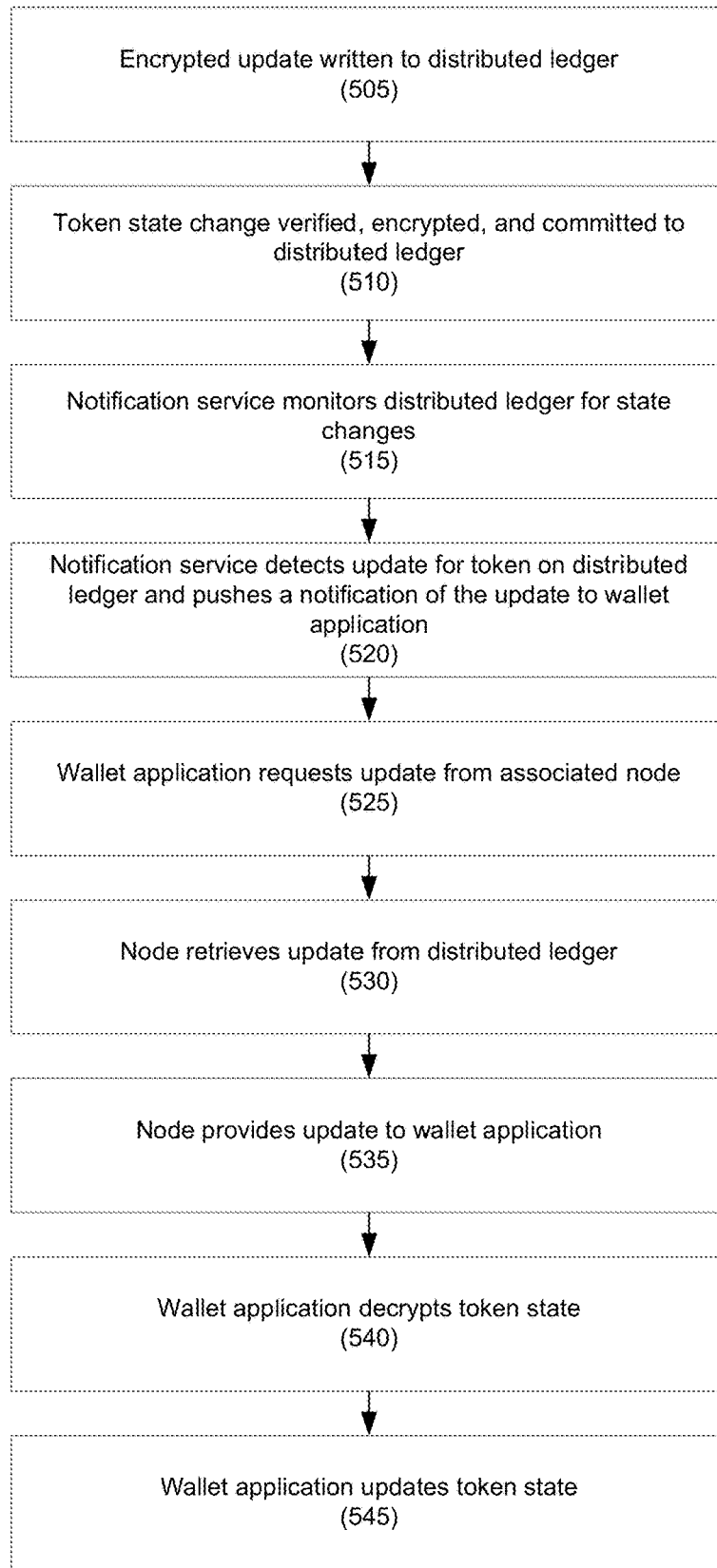
FIG. 5 depicts an exemplary method of card or token parameter management using distributed ledgers according to one embodiment.

Referring to FIG. 5, a method for card or token parameter management using distributed ledgers is disclosed according to one embodiment.

In step 505, a token state change may be received by a node (e.g., token service provider node, payment network node, token requestor/wallet provider node, and, in step 510, may be verified, and some or all of the data may be encrypted with the appropriate public key, and may be committed to the distributed ledger.

In step 515, a third-party notification service may monitor the distributed ledger for state changes related to the token(s) maintained in a wallet application.

In step 520, the third-party notification service may identify a change to the token state for one or more tokens maintained by the wallet application and may push a notification of the update to the wallet application.

In step 525, the wallet application receiving the notification may request the update to the token state from the node associated with the wallet application. In one embodiment, the wallet application may request the update immediately, when it has Internet connectivity, etc.

In step 530, the respective node may retrieve the state for the token from the distributed ledger, and in step 535, may provide the state to the wallet application. Some or all of the state change data may be encrypted with the public key for the wallet application.

In step 535, the wallet application may decrypt the encrypted state for the token using its private key, and in step 545, may update the token state.

Figure 6:
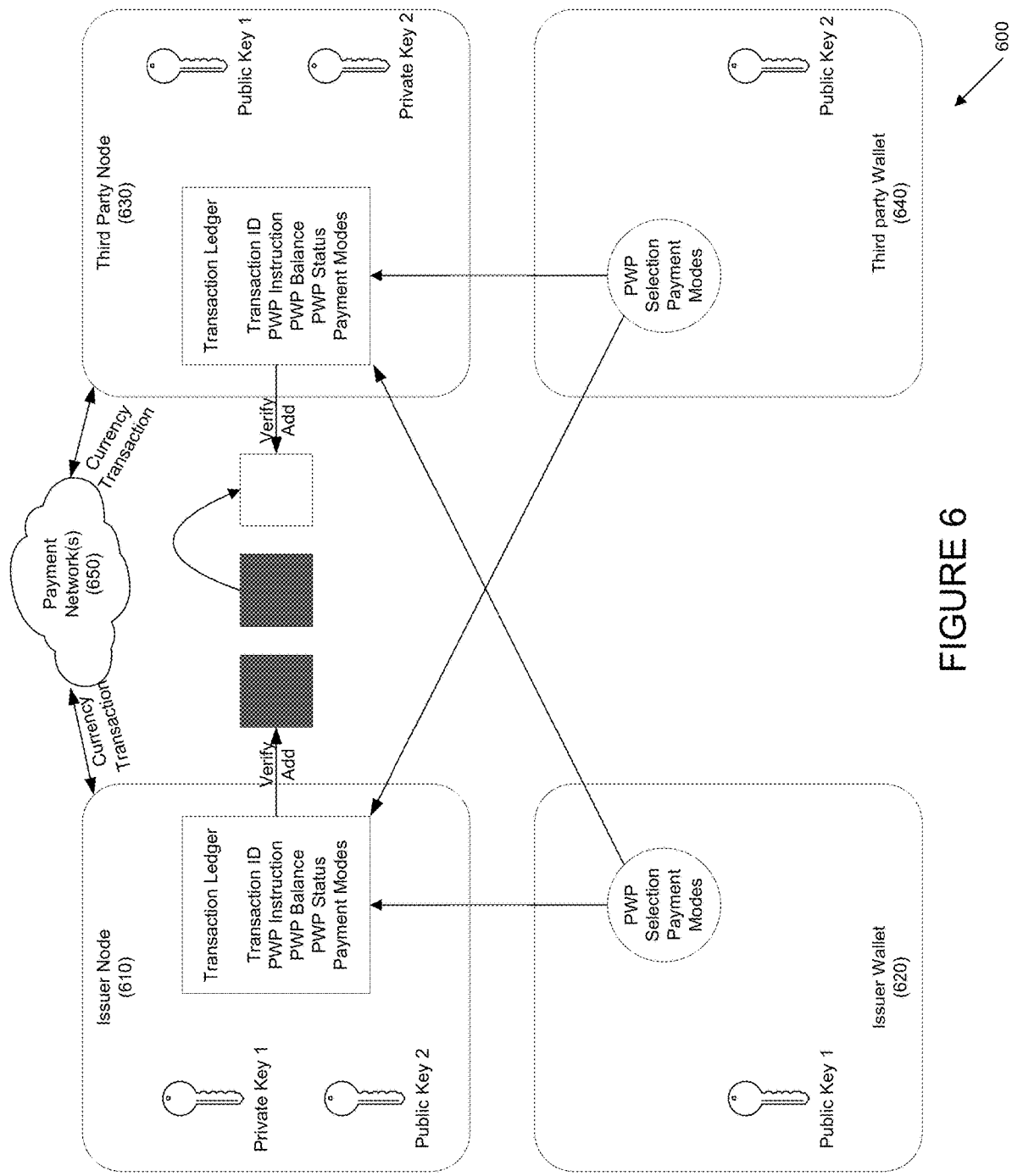
FIG. 6 depicts an exemplary system for transaction management using distributed ledgers according to one embodiment.

Referring to FIG. 6, an exemplary system of transaction management with an alternative payment currency using distributed ledgers is disclosed according to one embodiment. In one embodiment, the transaction may involve an alternate payment currency (e.g., pay with points).

In one embodiment, system 600 may include a plurality of wallets, such as issuer wallet 620 and third-party wallet 640. Wallets 620 and 640 may communicate with any node 610, 630, as is necessary and/or desired.

In one embodiment, the distributed ledgers may maintain transaction data, such as payment mode selections, transaction history, etc. In one embodiment, wallets 620 and 640 may optionally maintain a copy of the transaction ledger if desired.

Payment network 650 may be any suitable payment network for conducting a transaction. In one embodiment, payment network 650 may be used to conduct any part of the transaction that cannot be completed using points.

In one embodiment, if the user has sufficient points to cover the transaction, payment network 650 may be unnecessary.

In one embodiment, the issuer wallet and/or the third-party wallet may include an option to change the payment mode to pay with points. Some or all of the data associated with this selection may be encrypted and communicated to the issuer node and/or the third-party node, verified, and written to a transaction ledger. This may then be used to match a transaction from a merchant with the transaction, and may determine the order in which multiple alternate currency transaction occurred. This may eliminate a "race" condition between two separate alternate currency transactions as there is an immutable record of the transactions.

Figure 7:
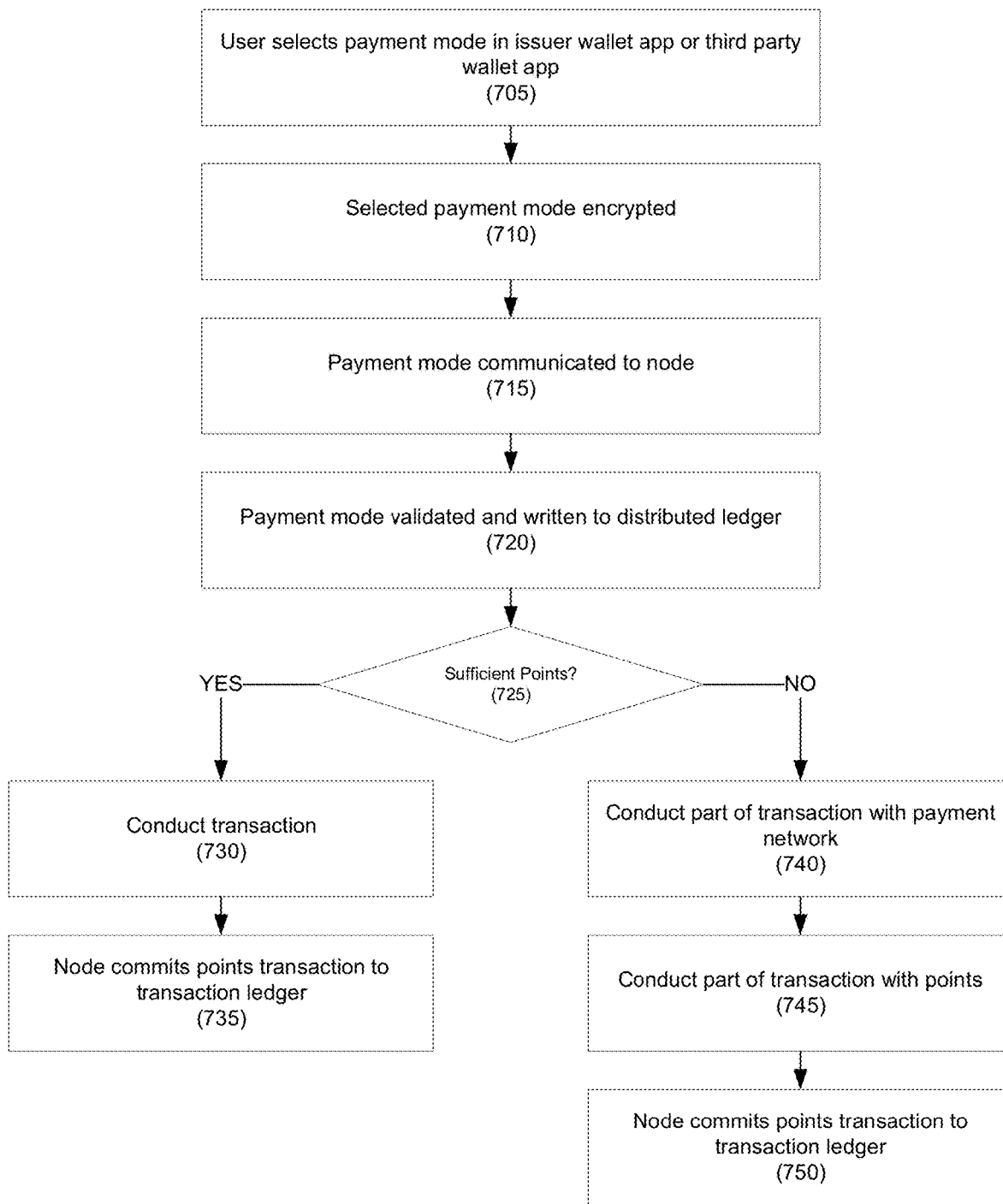
FIG. 7 depicts an exemplary method of transaction management using distributed ledgers according to one embodiment.

Referring to FIG. 7, a method for card or token parameter management using distributed ledgers is disclosed according to one embodiment.

In step 705, a user may select a payment mode in a wallet, such as an issuer wallet application or a third-party wallet application. An example payment mode is paying with points.

In step 710, the wallet may encrypt some or all of the data associated with the selected payment mode using asymmetric encryption, symmetric encryption, etc.

In step 715, the wallet may communicate the selected payment mode to the associated node (e.g., an issuer node or a third-party node). In one embodiment, the selected payment node may be communicated using an API gateway.

In step 720, the node may validate the payment mode. For example, for pay with points, the node may retrieve the user's point balance, for example, from the transaction ledger, and may validate that the user has a sufficient point balance for the transaction. The node may then write the transaction id, selected payment mode, points balance, etc. to the distributed ledger.

In step 725, if there are sufficient points for the entire transaction in step 730, the transaction may be conducted.

In step 735, the points transaction may be committed to the distributed ledger.

If there are insufficient points for the entire transaction, or if the user has selected a payment option in which points and payment are used, in step 740, a first part of the transaction may be conducted over the payment network, and in step 745, a second part may be conducted using points.

In step 750, the points transaction may be committed to the distributed ledger.

Figure 8:
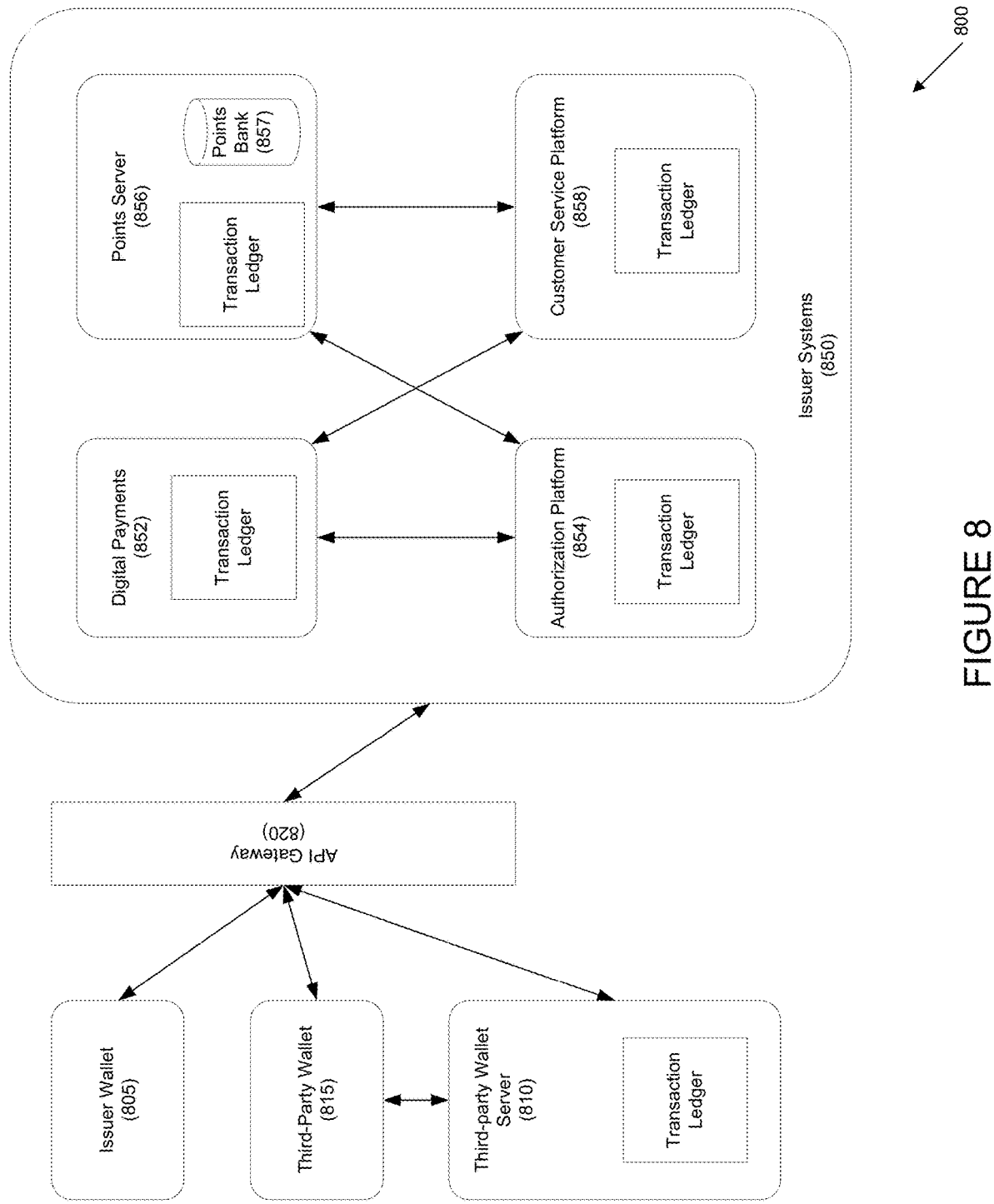
FIG. 8 depicts an exemplary system for alternate payment currency management using distributed ledgers according to one embodiment.

FIG. 8 depicts an exemplary system for alternate payment currency management using distributed ledgers according to one embodiment. System 800 may include issuer wallet 805, third-party wallet server 810, third-party wallet 815, API gateway 820, and issuer systems 850. In one embodiment, issuer wallet 805 and third-party wallet 815 may communicate with issuer systems 850 using a network such as a public network, and via API gateway 820. Third-party wallet server may communicate with issuer systems 850 using a network, such as a private network, and API gateway 820.

API gateway 820 may facilitate communications between wallet 805, wallet 815, third-party wallet server 810, and issuer systems 850. In one embodiment, third-party wallet server 810 and/or wallet 810 may participate as nodes in the distributed transaction ledger system. To that end, in one embodiment, third-party wallet server 810 and/or wallet 815 may maintain a copy of the transaction ledger.

It should be noted that a greater number of third-party wallet servers and/or third-party wallets may be provided as is necessary and/or desired.

Issuer systems 850 may include systems for facilitating the alternate currency transaction, including, for example, digital payments platform 852, authorization platform 854, points server 856, and customer service operations 858. Digital payments platform 852 may receive the transaction via API gateway 820 and may commit the transaction to the distributed transaction ledger. Authorization platform 854 may review and transaction on the distributed transaction ledger and may authorize or deny the transaction. Points server 856 may access points bank 857 to determine a points balance, and may verify that there are sufficient points in points bank 857 for the transaction. It not, it may write the transaction amount for which there are sufficient points. Customer service operations 858 may access the user's transaction history to handle customer complaints, returns, disputes, etc., and to make a change to the user's transaction history (e.g., apply a refund).

Other systems may be provided to issuer systems 850 as is necessary and/or desired.

In one embodiment, the distributed transaction ledger may maintain a points balance for a customer, and issuer systems 850 (e.g., digital payment platform 852, authorization platform 854, points server 856, customer service operations 858, etc.) may maintain a copy or have access to the ledger. In addition, third-party wallet server 815, third-party wallet 810, issuer wallet 805, etc. may access the ledger via an API gateway or using similar functionality.

Thus, as a user's points balance changes, it will be written to the ledger, and the participating parties, applications, services, etc. may access this information.

Although several embodiments have been disclosed, it should be recognized that these embodiments are not exclusive to each other, and features from one embodiment may be used with other embodiments as is necessary and/or desired.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for card or token parameter management using a distributed ledger, comprising:
    in node of a distributed ledger network comprising an information processing apparatus having at least one computer processor:
        receiving, from an electronic wallet, a token state change for a payment token associated with electronic wallet, wherein the token state change comprises a change in a payment channel suppression state of the payment token, and the token state change is encrypted with a public key associated with the electronic wallet;
        validating the encrypted token state change;
        in response to the validation, committing the encrypted token state change to a distributed ledger; and
        suppressing use of the payment token on one of a plurality of payment channels based on the payment channel suppression state.

2. The method of claim 1, wherein the token state change further comprises at least one of a change in a link state, a change in a bound state, and a change in a lifecycle state.

3. The method of claim 1, wherein the electronic wallet is associated with the node.

4. The method of claim 1, wherein a notification service notifies a second wallet of the token state change.

5. The method of claim 1, wherein the payment channel comprises a Near Field Communication channel.

6. A method for card or token parameter management using distributed ledgers, comprising:

in a notification service comprising at least one computer processor:

monitoring a distributed ledger for token state changes for a plurality of payment tokens, wherein the token state changes comprises a change in payment channel suppression states for the payment tokens;

detecting a change in a bound state for one of the plurality of payment tokens; and notifying an electronic wallet associated with the payment token of the change to the token state, wherein the electronic wallet retrieves the token state from the distributed ledger following receipt of the notification and suppresses use of the payment token on one of the plurality of payment channels based on the payment channel suppression state.

7. The method of claim 6, wherein the token state change originated with a second electronic wallet.

8. The method of claim 6, wherein the notification service is a third-party notification service.

9. The method of claim 6, wherein the notification is a push notification.

10. The method of claim 6, wherein the payment channel comprises a Near Field Communication channel.

11. A method for transaction management with an alternative payment currency using distributed ledgers, comprising:

in node in a distributed ledger network comprising at least one computer processor:

receiving, from an electronic wallet, a selection of a payment channel for a transaction;

validating an availability of the payment channel based on a payment channel suppression state of the payment channel;

in response to the validation, writing the payment channel and the validation to the distributed ledger, wherein the transaction is conducted using the payment channel; and writing the conducted transaction with the payment channel mode to the distributed ledger.

12. The method of claim 11, wherein the payment channel comprises a Near Field Communication channel.

13. The method of claim 11, wherein the step of validating an availability of the payment channel comprises:

retrieving, from an issuer system associated with the payment channel, validation that at least a portion of the transaction can be conducted with the payment channel; and retrieving, from the issuer system, the payment channel suppression state of a payment token associated with the payment channel;

wherein the portion of the transaction that can be conducted with the payment channel is conducted with the payment channel.

14. The method of claim 13, wherein a second portion of the transaction is conducted over a payment network, further comprising:

writing the second portion of the transaction to the distributed ledger.

15. The method of claim 11, wherein at least one of the payment channel and the validation is encrypted before being written to the distributed ledger.

16. The method of claim 11, wherein the payment channel is received via an API gateway.

* * * * *